US006327384B1

(12) United States Patent
Hirao et al.

(10) Patent No.: US 6,327,384 B1
(45) Date of Patent: *Dec. 4, 2001

(54) CHARACTER RECOGNITION APPARATUS AND METHOD FOR RECOGNIZING CHARACTERS

(75) Inventors: Kouichirou Hirao; Keiji Yamada; Takahiro Hongu; Takashi Mochizuki; Mitsutoshi Arai, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,150

(22) Filed: Nov. 13, 1997

(30) Foreign Application Priority Data

Nov. 13, 1996 (JP) .................................... 8-301523

(51) Int. Cl.⁷ ...................................... G06K 9/34
(52) U.S. Cl. ..................... 382/173; 382/174; 382/177; 382/171; 382/200; 382/209
(58) Field of Search ................... 382/168, 185, 382/200, 173–178, 170–172, 209; 358/462, 467, 470

(56) References Cited

U.S. PATENT DOCUMENTS

| 4,635,290 | * | 1/1987 | Tsuji et al. ............... 382/174 |
| 5,303,313 | | 4/1994 | Mark et al. ............... 382/56 |
| 5,696,841 | * | 12/1997 | Nakatsuka ............... 382/174 |

FOREIGN PATENT DOCUMENTS

| 0 472 313 A | 2/1992 | (EP) . |
| 63-184479 | 7/1988 | (JP) . |
| 1-118966 | 5/1989 | (JP) . |
| 2-194772 | 8/1990 | (JP) . |
| 3-58288 | 3/1991 | (JP) . |
| 3-240173 | 10/1991 | (JP) . |
| 4-373091 | 12/1992 | (JP) . |
| 5-40848 | 2/1993 | (JP) . |
| 6-38048 | 2/1994 | (JP) . |
| 6-189140 | 7/1994 | (JP) . |
| 7-262164 | 10/1995 | (JP) . |

OTHER PUBLICATIONS

Jun Sato, et al. "F6365 Japanese Document Reader". Fikotsi–Scientific and Technical Journal, vol. 26, No. 3, Jan. 1, 19990, pp. 224–233.

* cited by examiner

Primary Examiner—Phuoc Tran
(74) Attorney, Agent, or Firm—Foley & Lardner (57) ABSTRACT

In a projection means black pixel histograms of a binary stationary image are generated in both the vertical and the horizontal direction. In a text type judgment means, in accordance with these histograms, a determination is made of whether the image is vertical text or horizontal text. Based on the result of this determination, a pattern block extraction means extracts either a column or a row from the image. The block is further projected and divided into smaller blocks. Then projection is again applied to these divided blocks and patterns are extracted by a pattern extraction means. A judgment is made as to whether or not joining of the extracted patterns is to be performed and, if joining is required, they are joined by a pattern joining means and finally the offsets of all the extracted patterns are calculated, whereupon data (of extracted patterns) are sent to a pattern matching process.

8 Claims, 5 Drawing Sheets

PROJECTION OF IMAGE

FIG. 3(B)

PROJECTION OF COLUMN (LINE IN THE CASE OF VERTICAL TEXT)

PATTERN JOINING AND EXTRACTION

II. PHENOMENOLOGY OF HALL AND

CHARACTER RECOGNITION APPARATUS AND METHOD FOR RECOGNIZING CHARACTERS

BACKGROUND OF THE INVENTION

1. Field of the Invention

The present invention relates to an apparatus for coding a binary stationary image, and more specifically to an apparatus for one which extracts a pattern from a binary image in a system for pattern matching coding.

2. Description of Related Art

In the past, a method for coding of a binary stationary image using pattern matching has been known, this coding method being one in which an image is divided into patterns which are collections of continuously arranged black pixels, with matching being performed with respect to each pattern.

Then, in accordance with the results of this pattern matching, the bit maps for the patterns themselves and information which represents the pattern positions and sizes are coded.

In a binary stationary image coding method which uses pattern matching as described above, when extracting a pattern from an image, black pixels are detected by scanning along the image from the upper left part to the lower right part thereof.

Next, the outline contour of the collection of continuously arranged black pixels, is traced with a detected black pixel as the starting point to determine the contour of the pattern. Finally, the contents of this contour is extracted as the pattern.

When performing the above operations, absolute coordinates on the first appearing pattern are used as the reference in indicating the position of a pattern, with other patterns basically being expressed as a related distance (offset) from the immediately previously appearing pattern.

Considering the above-noted point, in horizontally written text, the offset values will be small, making the coding efficiency improved than the base in which all patterns are expressed in absolute coordinates.

It occurs that, in the binary stationary image coding method of the past, when extracting a pattern (for example, when extracting a pattern from Japanese-language text or Chinese language text), because of, for example, the characteristic of Japanese that it is made up of many kanji ideographic characters that are complex and that have a large number of strokes, there are cases in which a single character will have a plurality of patterns.

Figure 5:
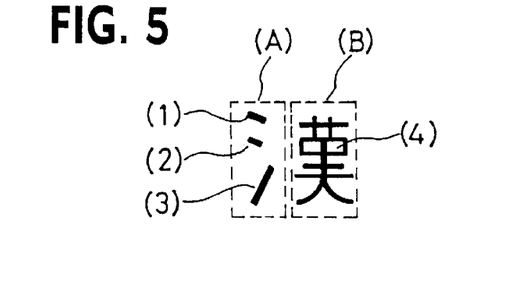
FIG. 5 show one embodiment of a construction of Kanji character.

For example, with regard to the character "KAN" as shown in FIG. 5, as used in the word kanji itself, there are three patterns (1), (2) and (3) in the left "radical" part (A) of the character as shown in FIG. 5 and one part (4) in the right "tsukuri" part (B) of the character, as shown in FIG. 5, making a total of four patterns, resulting in a very large total number of patterns.

As a result, there are excess of data resulting from the need to express the pattern positions, sizes, and the results of pattern matching. This leads to the problem of reduced efficiency in coding.

Additionally, in the binary stationary image coding method of the past, when extracting a pattern, if noise is mixed in with the image so that even for one and same character the associated shape can be slightly different, even for one and the same character, there can be differences in the number of divided patterns and/or the shapes of the patterns.

For this reason, there is an increase in the number of types of patterns, this leading to the problem of a reduction in coding efficiency.

Another problem is that, when extracting a pattern as done in the past, because the offset is the distance to the immediately previously appearing pattern, that is, because the offset is expressed as the distance to the pattern positioned to the left of the pattern of interest, because of the scanning direction, for vertically written text, the spaces between lines are redundant. This leads to the problem of a reduction in coding efficiency.

An object of the present invention is to provide a pattern extraction apparatus that, in extracting a pattern using binary stationary image coding that uses pattern matching, is capable of reducing the number of patterns and number of pattern types, thereby improving the coding efficiency.

Another object of the present invention, is to provide a pattern extraction apparatus that is capable of efficient determination of offset with regard to vertically written text, similar to that of horizontally written text.

Note that, regarding documents which are written by English, German, French or the like, it is usually written in horizontal direction and thus only a writing direction for the row should be confirmed first. Thereafter such reduction of the number of patterns and improvement of the coding efficiency as mentioned above, are also required.

SUMMARY OF THE INVENTION

To achieve the above-noted objects, the present invention is a pattern extraction apparatus that is used in performing coding of a pattern in accordance with the results of dividing a binary stationary image into patterns and performing pattern matching with respect to each of the divided patterns. This pattern extraction apparatus includes a means for projecting the black pixels in the above-noted binary stationary image and determining a histogram thereof, a document type determining means for determining, in accordance with the above-noted histogram, whether the above-noted binary stationary image is horizontally written text or vertically written text and for outputting the result of this determination, a means for extracting a block from the above-noted image in accordance with the above-noted determination result; and means for extracting a pattern in accordance with the above-noted block, and means for calculating the relative distance between the currently extracted pattern and the immediately previously extracted pattern, as an offset.

For example, the above-noted binary stationary image has both vertical and horizontal directions and the above-noted projection means projects each of the black pixels in the vertical and horizontal directions to generate the above-noted histogram.

Additionally, if the above-noted determination results are that the text is disposed in the horizontal direction, the above-noted block extraction means extracts the above-noted block from the above-noted binary stationary image as a column, but if the above-noted determination results a re that the text is disposed in the vertical direction, the above-noted block extraction means extracts the above-noted block from the above-noted binary stationary image as a row.

It is additionally possible, with respect to the above-noted extracted column or row, for the above-noted projection means to project in a first direction, which is perpendicular with respect to the direction of the above-noted column or row so as to determined a sub-histogram and, in accordance with this sub-histogram, the above-noted block extraction means then divides the above-noted column or row into divided blocks and provides these divided blocks to the above-noted pattern extraction means as the above-noted block.

It is also further possible, with respect to the above-noted block, for the above-noted projection means to project in a second direction, which is perpendicular to the above-noted first direction, and to output a projection result. The above-noted pattern extraction means then extracts the above-noted extracted pattern from the above-noted block based on this projection result. In this case, a joining determining means makes a determination as to whether, with respect to the above-noted extracted pattern, the pattern is extracted as a unit of character for each one of the pattern, this being done in units of characters and output the result of the determination.

Then a joining means, in response to the above-noted determination results, joins patterns together to form a joined pattern as one unit of characters.

This joined pattern is given to the above-noted offset calculation means as the above-noted extracted pattern.

In a pattern extraction apparatus according to the present invention, in the projection means a histogram is generated of black pixels in each of the vertical and horizontal directions in the input binary stationary image.

In accordance with the resulting output, in the document type determining means, a determination is made as to whether the document is horizontal text or vertical text, after which in the pattern block extraction section a column or row is extracted.

Additionally, a projection is taken of this block, and division thereof is made into smaller blocks.

A projection is then again made of the divided blocks and a pattern is extracted at the pattern extraction means.

A judgment is made as to whether or not to join the extracted patterns. If joining is necessary joining is done at the pattern joining section and finally the offsets are calculated for all the extracted patterns, with data (extracted patterns) being passed to the pattern matching processing.

Thus, in the present invention by taking a projection an image is divided up into smaller patterns, pattern joining being performed with respect to patterns that are too finely broken up, control being performed so that patterns are extracted nearly in units of characters.

Therefore, the number of patterns is reduced, thereby reducing the amount of excess data for offsets, pattern sizes, and matching results. In addition, because there is a reduction in the number of types of patterns, the accuracy of pattern matching is improved, as is pattern matching efficiency.

As described above, because the pattern extraction direction is the direction of a text column or row, it is possible to perform efficient offset calculation for either vertical or horizontal text.

BRIEF DESCRIPTION OF THE DRAWINGS

FIG. 3 is a drawing which shows an example of pattern extraction by means of image projection, and FIG. 3(A) showing the projection of an image, FIG. 3(B) showing the projection of a column, and FIG. 3(C) showing pattern joining and extraction.

FIG. 4 is a drawing which shows an example of pattern extraction from an English text by means of image projection, and FIG. 4(A) showing the projection of an image, FIG. 4(B) showing the projection of a row.

DETAILED DESCRIPTION OF THE PREFERRED EMBODIMENTS

Embodiments of present invention are described below, with reference being made to the relevant accompanying drawings.

Figure 1:
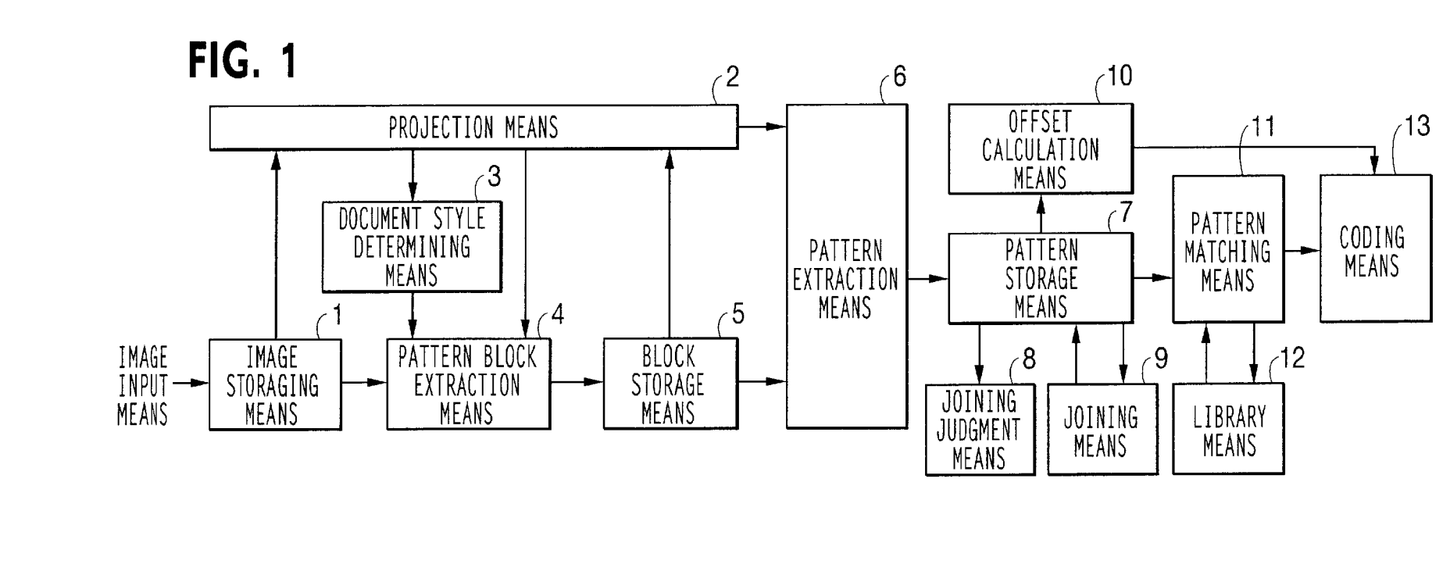
FIG. 1 is a block diagram which shows an example of a coding apparatus that has a pattern extracting apparatus according to the present invention.

Referring to FIG. 1, the binary stationary image coding apparatus shown in this drawing performs coding of a binary stationary image by using pattern matching.

This binary stationary image coding apparatus includes an image storage means 1, a projection means 2, a document style determining means 3, a pattern block extraction means 4, a block storage means 5, a pattern extraction means 6, a pattern storage means 7, an overall judgment means 8, a joining means 9, an offset calculation means 10, a pattern matching means 11, a library means 12, and a coding means 13.

Figure 2:
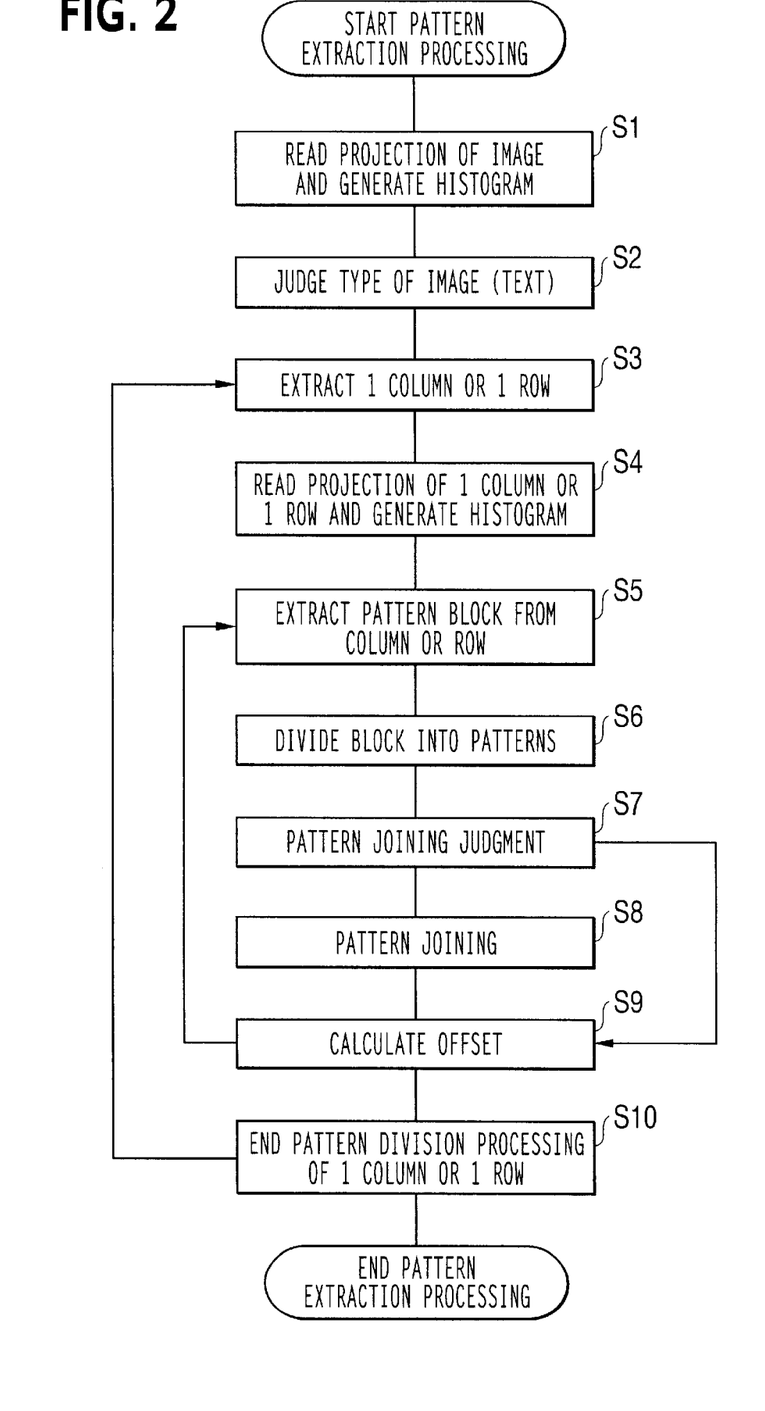
FIG. 2 is a flowchart which illustrates the operation of the pattern extraction apparatus which is shown in FIG. 1.

Turning to FIG. 2 and FIG. 3, when pattern extraction processing is started, the imaging input means (not shown in the drawings) for example reads in the input image and generates binary image data, this binary image data being given to the storage means 1, in which this binary image data is temporarily stored.

At the projection means 2, the binary image data is received and a projection is made of the binary image data to generate a histogram of black pixels (step S1).

Specifically, at the projection means 2 projections of black pixels are made in the vertical and horizontal directions with respect to the binary image data, thus generating a black pixel histogram (this histogram being hereinafter referred to as the first histogram; refer to FIG. 3(a)).

Then, the first histogram is given to the document style determining means 3.

At the document style determining means 3, in response to the first histogram a judgment is made with regard to the type of image (text) (step S2).

That is, at the document style determining means 3, a judgment is made as to whether the input image or document is vertical text or horizontal text, based on the number of valleys in the first histogram, which are the locations in which the rate of occurrence of black pixels is small, this judgment information (judgment result) being output to the pattern block extraction means 4.

Figure 3A:
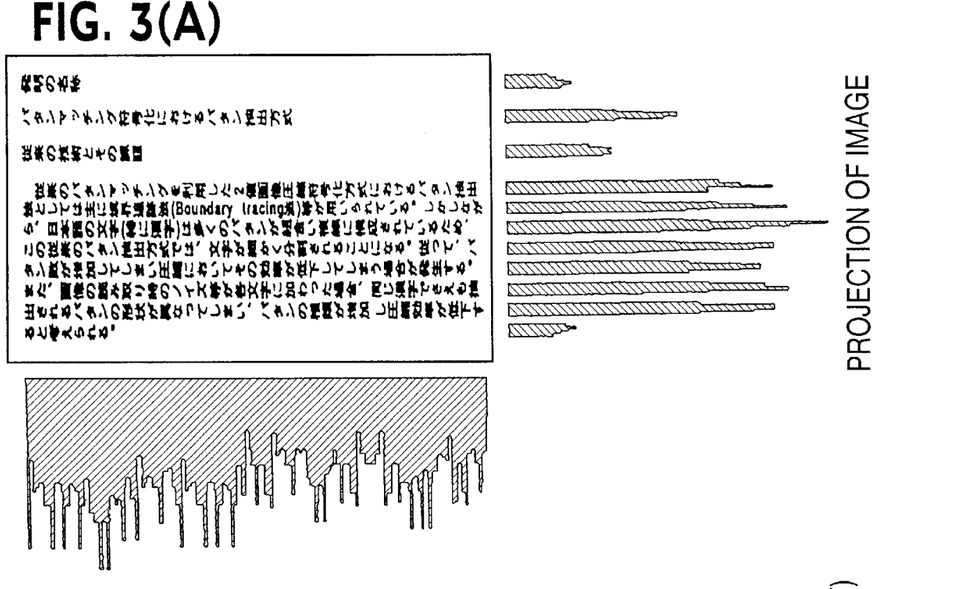

In the example shown in FIG. 3(a), the judgment is made that this is vertical text.

At the pattern block extraction means 4, in accordance with the judgment result, one column or one row is extracted from the image data that is stored in the storage means 1 (step S3).

That is, at the pattern block extraction means 4, if the judgment result was vertical text a column is extracted from the image data stored in the storage means 1, and if the judgment result was horizontal text a row is extracted from the image data stored in the storage means 1.

Then, the extracted column or row is stored as a block in the block storage means 5 and also given to the projection means 1.

Figure 3B:
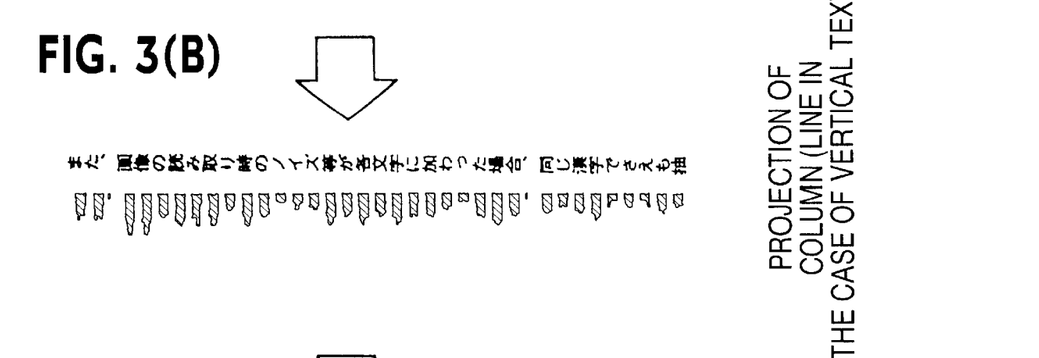

In the example shown in FIG. 3(a), for example, one column is extracted, as shown in FIG. 3(b).

Figure 6:
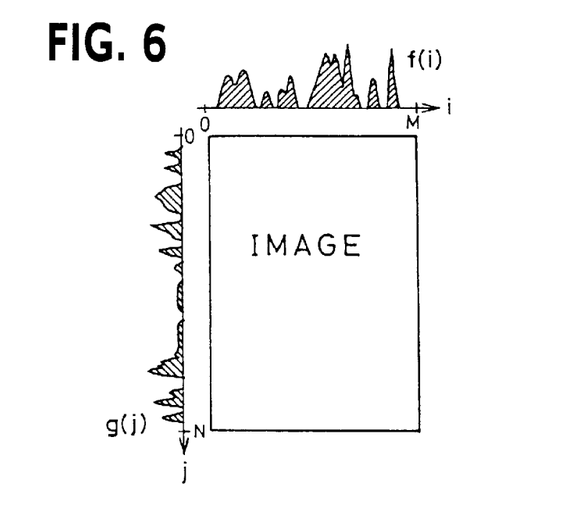
FIG. 6 shows one embodiment of determination for writing direction in an image document used in the present invention and FIG. 7A shows one embodiment of extracting one block from the image document.

The projection of image as used in the present invention will be explained hereunder, as an example;

As shown in FIG. 6, in an image to be scanned, when assuming that a number of a main scanned pixels arranged in a horizontal direction is M, while sub-scanned pixels arranged in a vertical direction is N and further a pixel locating i-th number from the most left-end portion of the image and j-th number from a top of the image is represented as P(i, j), wherein $1 \leq i \leq M$, and $1 \leq j \leq N$, the projection f(i) in the vertical direction can be represented as follows:

In a j-th row, the j-th row is scanned in a vertical direction with respect to the image and a number of black pixels b (I) is calculated.

Note that in the present invention, when a white pixel is represented as p(i, j)=0, and a black pixel is represented as p(i, j)=1, b (i) can be shown as the following formula;

$$b(i) = \sum_{j=1}^{N} p(i, j)$$

Accordingly, in this case, f(i) is shown as follows;

$$f(i) = \sum_{j=1}^{N} p(i, j)$$

In the same way, the projection in a horizontal direction g(j) can be shown, as the following formula;

$$g(j) = \sum_{i=1}^{M} p(i, j)$$

Note that the above-mentioned f(i) and g(j) represent the histogram, respectively.

The determination whether a document to be checked is written in vertical direction or is written in horizontal direction, can be done as follows;

With respect to the histograms in a vertical direction f(i) and the histogram in a horizontal direction g(i), numbers of portions at which the f(i)=0 and g(j)=0 are Cf and Cg, respectively.

And then, a ratio of Cf in the horizontal direction with respect to a total pixel number M, that is Rf=Cf/M is calculated while a ratio of Cg in the vertical direction with respect to a total pixel number N, that is Rg=Cg/N is calculated, and finally, the determination whether or not a document being written in a horizontally direction, can be done by ultimately comparing Rf with Rg.

Note that if when Rf>Rg, it is determined that the document is written in a vertical direction and while if when Rf<Rg, it is determined that the document is written in a horizontal direction.

If when Rf=Rg, either one of the determinations can be effective.

At the projection means 2, with respect to the extracted column or extracted row, projection is again made, in the horizontal direction in the case of a column, and in the vertical direction in the case of a row, thereby again generating a histogram (step S4).

As shown in FIG. 3(b), in the case of a column projection is made in the horizontal direction to generate a histogram (hereinafter referred to as the second histogram). Then, this second histogram is given in turn to the pattern block extraction means 4.

Figure 7A:
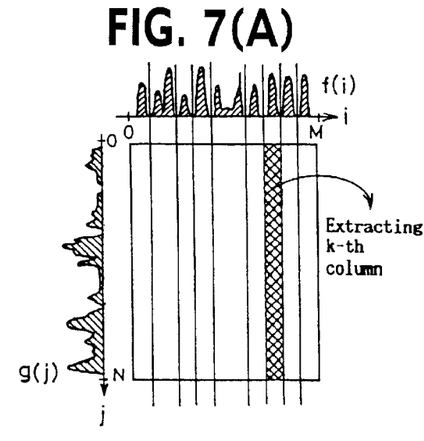
Figure 7B:
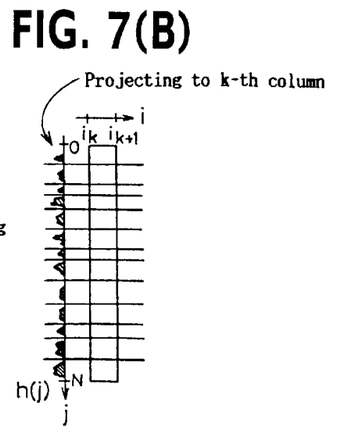
FIG. 7B shows one embodiment of extracting one sub-block from one block used in the present invention.

The extracting of either one of rows or columns as a block from an image and the projecting operation to the block extracted from the image is explained hereunder with reference to FIG. 7.

In this process, as shown in FIG. 7(A), a k-th column is extracted from the image having the histograms in both directions as obtained in the previous step as shown in FIG. 6.

Note that when with respect to the formula of f(i) as mentioned above, the number i represents the location at which the f(i) is 0, i.e., f(i)=0, and i includes i1, i2, . . . iK (K denotes a number of i when f(i)=0), the k-th column can be extracted as a column having an width of $i_k \leq i \leq i_{k+1}$, under a condition of $i_{k+1} - i_k > 1$.

And next, the projection is carried out for one column of k-th column extracted from a vertically written document will be explained.

Note that, in this case, since the projection is carried out only in the horizontal direction.

As explained above, the projection of the k-th column in the horizontal direction h(j) can be represented by the following formula;

$$h(j) = \sum_{j=i_k}^{i_{k+1}} p(i, j)$$

Further, the value j at which h (j) shows 0, i.e., h (j)=0, is determined and thereafter the block can be further divided and this process can be iterated until the minimum size of block can be divided out.

At the pattern block extraction means 4, in response to the second histogram, further division into smaller blocks is made of the extracted column or row (step S5). For example, in accordance with the second histogram, the pattern block extraction means 4 extracts each character from the extracted column or row as a divided block (FIG. 3(b)). Then these divided blocks are stored in the block storage means 5.

The projection means 2 reads in each divided block from the block storage means 5, and performs projection with respect to a column or a row, in a direction that is perpendicular to the column or row so as to obtain a block projection result. The block projection result is then sent to the pattern extraction means 6. It is also possible to make a determination from this projection result as to whether or not block extraction was made which bridged two or more columns or rows. That is, it is possible to determine whether or not each of the divided blocks contains two or more characters.

The pattern extraction means 6 reads in each divided block from the block storage means 5 and, in accordance with the block projection result, performs pattern extraction, which divides the divided blocks into patterns (step S6), the extracted patterns being stored in the pattern storage means 7.

As is clear from the foregoing description, patterns extracted at the pattern extraction means 6 are extracted in approximate units of characters, and upon the third division of blocks, there are cases in which characters are divided into a plurality of patterns.

For this reason, the joining judgment means 8 reads in the extracted patterns from the pattern storage means 7, makes a judgment as to whether or not each extracted pattern is itself a character, and performs a judgment as to whether or not it is necessary to join mutually neighboring patterns, this joining judgment means 8 making a judgment as to which extracted patterns are to be joined (step S7).

That is, the joining judgment means 8 makes a determination as to whether or not extracted patterns are to be joined, and outputs this judgment result.

If, in accordance with the judgment result, joining of patterns is necessary, at the joining means 9, patterns of the extracted pattern which are mutually neighboring are joined together (this can be done for a plurality of patterns; step S8), and stored in the pattern storage means 7 as a joined pattern.

Figure 3C:
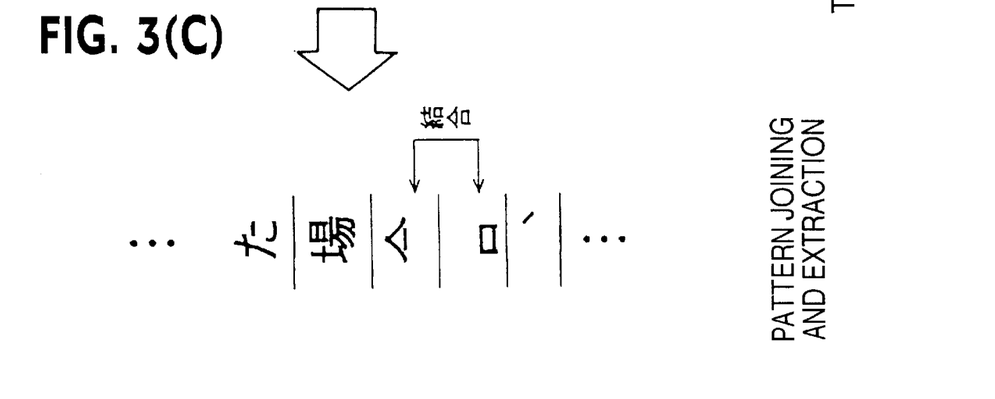
Figure 4A:
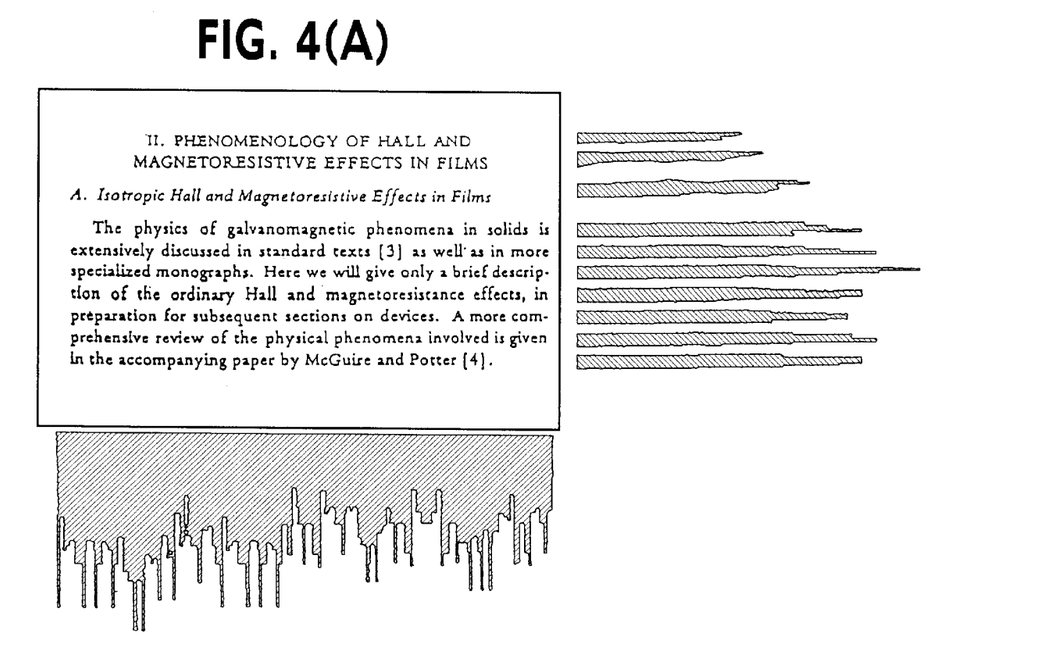
Figure 4B:
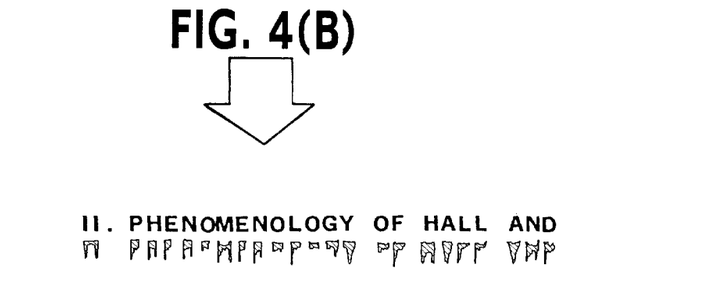

In this manner characters that were divided into a plurality of patterns can be extracted in approximate units of characters (FIG. 3(c)).

Note that, when a document which is written by English, German or French or the like, is used for extracting patterns therefrom, it is seldom for the joining judgment means 8 and joining means 9 to be actually used.

Thereafter, the offset calculation means 10 calculates the offset with regard to patterns stored in the pattern storage means 7 (step S9).

As described earlier, as a result of performing pattern extraction approximately along columns or rows, the offset calculation means 10 can obtain the optimum offset by merely calculating the relative distance of the character of interest to the immediately previously appearing character.

The first appearing character, however, is given in absolute coordinates on the image, and for a pattern at the beginning of a column or a row, the offset is obtained by calculating the relative distance to the pattern at the beginning of the previous column or previous row. This offset is sent to the coding means.

In addition, patterns which are stored in the pattern storage means 7 are given to the pattern matching means 11, at which pattern matching processing is performed. Specifically, at the pattern matching means 11 matching is performed between the stored patterns and library patterns generated in the library means 12, and the matching result of this operation is output. In performing this matching processing, matching is judged by comparison of pattern size and by taking the exclusive-OR of library patterns with the input pattern (stored pattern).

The matching result obtained by the pattern matching means 11 and the stored patterns for each matching result are output from the pattern matching means 11 to the coding means 13.

Then, at the coding means 13, coding of the stored patterns is done, based on the matching results. When doing this, if necessary library patterns are sent to the coding means 13. In addition, at the coding means 13, the offset is separately coded, along with data that represents the size of patterns.

By performing the above-described operations, when the pattern division for one column or one row is completed (step S10), step S3 is again executed, and when pattern division is completed for all the input image data, the pattern extraction processing ends.

In the storage means 1, it is not necessary to store an entire page of binary image, it being sufficient to store a number of lines of image, after which it is possible to successively input more lines of the image.

In addition, the coding method used in the coding means 13 can be selected as required from a plurality of types of coding methods.

Furthermore, the method of library pattern generation and updating in the library means 12 can, as necessary, be selected from a plurality of methods.

Upon performing an experiment with respect to a CCITT No. 7 image using a 200 dpi image, whereas 3609 image were extracted using a coding apparatus of the past, using the coding apparatus which is shown in FIG. 1, the number of extracted patterns was 2505, this demonstrating an improvement of from 11.8 to 13.4 times with respect to compression ratio as well, in comparison with the past system.

With the present invention as described in detail above, in performing binary image pattern extraction by using pattern extraction, with respect to even Japanese-language text, it is possible to extract patterns in approximate units of characters, this resulting in an improvement in coding efficiency.

Additionally, it is possible to calculate offset efficiently in the same manner for both vertical and horizontal text, this also improving coding efficiency.

As explained above, the other aspect of the present invention is a method for extracting patterns from a binary stationary image and is used in performing coding of a pattern in accordance with the results of dividing a binary stationary image into patterns and performing pattern matching with respect to each of said divided patterns, said method comprising the steps of, projecting black pixels in said binary stationary image and determining a histogram thereof, determining, in accordance with said histogram, whether said binary stationary image is horizontally written text or vertically written text and for outputting a result of said determination of said document style determining means, extracting a block from said image in accordance with said determination result, extracting a pattern in accordance with said block, and calculating a relative distance between a currently extracted pattern and an immediately previously extracted pattern, as an offset.

And further aspect of the present invention is a recording medium which stores a controlling program for extracting patterns from a binary stationary image which can be performed by a computer, wherein said program is for extracting patterns from a binary stationary image and is used in performing coding of a pattern in accordance with the results of dividing a binary stationary image into patterns and performing pattern matching with respect to each of said divided patterns. The program comprises the steps of: projecting black pixels in said binary stationary image and determining a histogram thereof, determining, in accordance with said histogram, whether said binary stationary image is horizontally written text or vertically written text and for outputting a result of said determination of said document style determining means, extracting a block from said image in accordance with said determination result, extracting a pattern in accordance with said block, and calculating a relative distance between a currently extracted pattern and an immediately previously extracted pattern, as an offset.

What is claimed is:

1. A character recognition apparatus that is used in performing coding of a pattern in accordance with the results of dividing a binary stationary image into patterns and performing pattern matching with respect to each of said divided patterns, said pattern extraction apparatus comprising:

projection means for projecting black pixels in said binary stationary image and determining a histogram thereof;

document style determining means for determining, in accordance with said histogram, whether said binary stationary image is horizontally written text or vertically written text and for outputting a result of said determination of said document style determining means;

means for extracting a block from said image in accordance with said determination result;

pattern matching means for performing pattern matching operation by comparing said input pattern with a pattern as stored in a library;

coding means for coding said input pattern into coded data depending upon an off-set data and a result of said pattern matching operation;

means for extracting a pattern based on said block;

means for making a joining judgment which determines whether or not said extracted pattern is extracted as a unitary character;

means for joining extracted patterns in accordance with output from said means for making a joining judgment; and means for calculating a relative distance between a currently extracted pattern and an immediately previously extracted pattern, as an offset.

2. A character recognition apparatus according to claim 1, wherein said binary stationary image has a vertical direction and a horizontal direction, and wherein said projection means takes a projection of black pixels in said vertical direction and said horizontal direction to generate said histogram.

3. A character recognition apparatus according to claim 2, wherein when said judgment result of said document style determining means corresponds to vertically aligned text, said block extraction mean extracts a column as a block from said binary stationary image, and when said judgment result of said document style determining means corresponds to horizontally aligned text, said block extraction means extracts a row as a block from said binary stationary image.

4. A character recognition apparatus according to claim 1, wherein when said judgment result of said document style determining means corresponds to vertically aligned text, said block extraction means extracts a column as a block from said binary stationary image, and when said judgment result of said document style determining means corresponds to horizontally aligned text, said block extraction means extracts a row as a block from said binary stationary image.

5. A character recognition apparatus according to claim 4, wherein with respect to said extracted column or row, said projection means performs further projection in a first direction that is perpendicular with respect to said column or said row and determines a sub-histogram, in accordance to which said block extraction means divides said column or said row and provides said divided block to said pattern extraction means.

6. A character recognition apparatus according to claim 5, wherein, with respect to said block, said projection means further projects in a second direction, which is perpendicular to said first direction and output a result of said projection, and wherein said pattern extraction means, based on said projection result, extracts said extracted pattern from said block.

7. A method of character recognition for recognizing complex characters comprised of simpler patterns, said method comprising the steps of:

projecting black pixels in said binary stationary image and determining a histogram thereof;

determining, in accordance with said histogram, whether said binary stationary image is horizontally written text or vertically written text and outputting a result;

extracting a block from said image in accordance with said result of said step of determining;

extracting a plurality of patterns in accordance with said block;

performing a pattern matching operation on each pattern in said block by comparing each pattern of said plurality of patterns with patterns stored in a library;

determining whether or not each extracted pattern corresponds to a unitary character;

joining extracted patterns based on said step of determining whether or not an extracted pattern corresponds to a unitary character;

coding said input pattern into coded data depending upon an off-set data and a result of said pattern matching operation; and calculating a relative distance between a currently extracted pattern and an immediately previously extracted pattern, as an offset.

8. A recording medium which stores a controlling program for character recognition from a binary stationary image which can be performed by a computer, wherein said program is for character recognition from a binary stationary image and is used in performing coding of a pattern in accordance with the results of dividing a binary stationary image into patterns and performing a pattern matching with respect to each of said divided patterns, said program comprising the steps of:

projecting black pixels in said binary stationary image and determining a histogram thereof;

determining, in accordance with said histogram, whether said binary stationary image is horizontally written text or vertically written text and outputting a result;

extracting a block from said image in accordance with said result of said step of determining;

extracting a pattern in accordance with said block;

performing pattern matching operation by comparing said input pattern with a pattern as stored in a library;

coding said input pattern into coded data depending upon an off-set data and a result of said pattern matching operation;

determining whether or not an extracted pattern corresponds to a unitary character;

joining extracted patterns based on said step of determining whether or not an extracted pattern corresponds to a unitary character; and calculating a relative distance between a currently extracted pattern and an immediately previously extracted pattern, as an offset.

* * * * *